Jan. 26, 1965 L. A. DE ROSA 3,167,774
MULTI-ANTENNA DIRECTION FINDER
Filed Dec. 5, 1952 3 Sheets-Sheet 1
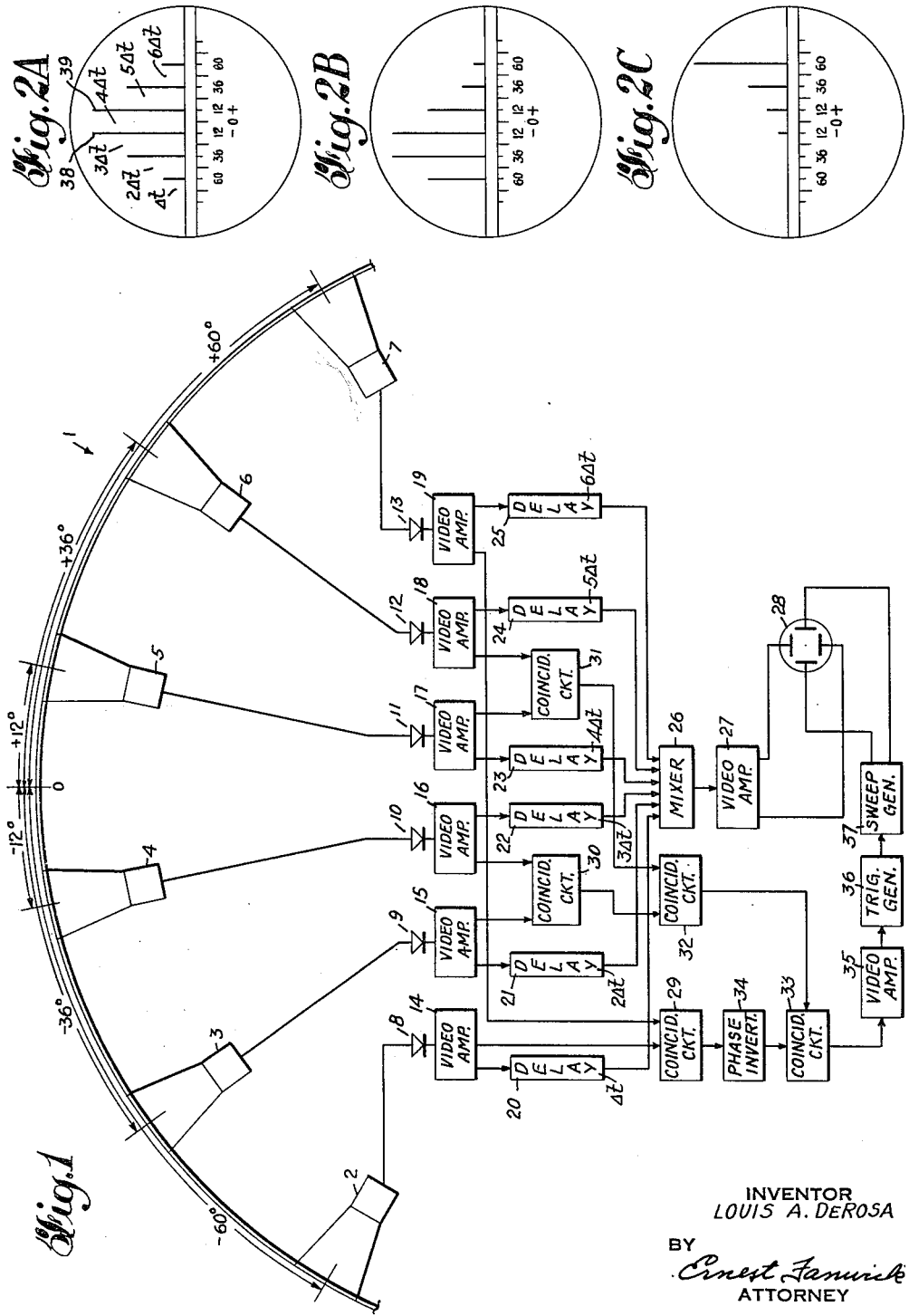
INVENTOR
LOUIS A. DEROSA
BY
Ernest Fanwick
ATTORNEY

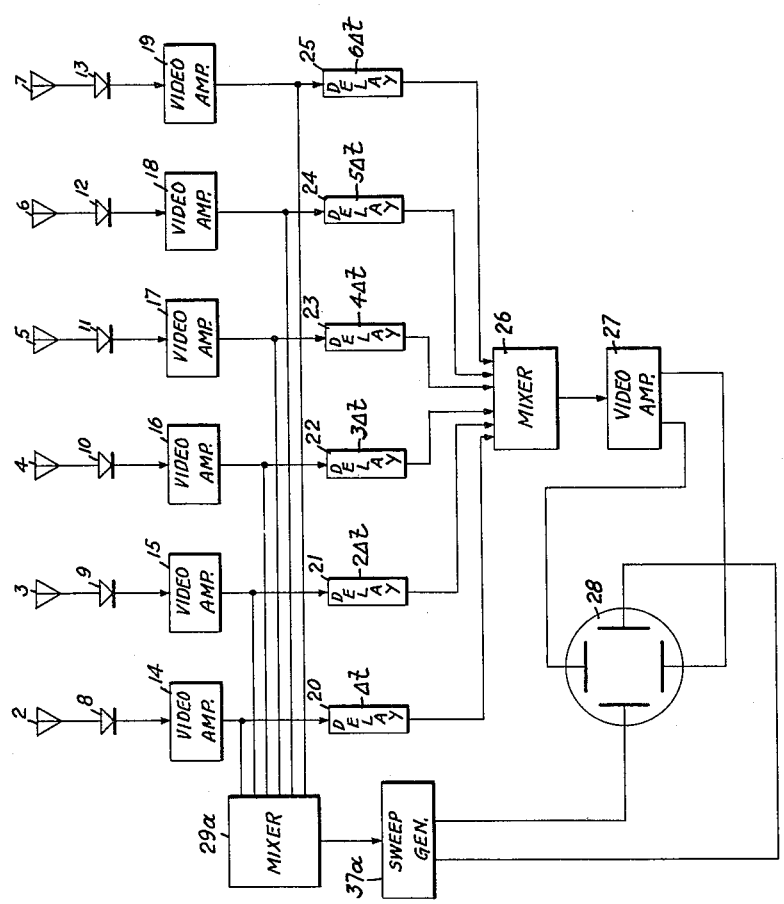

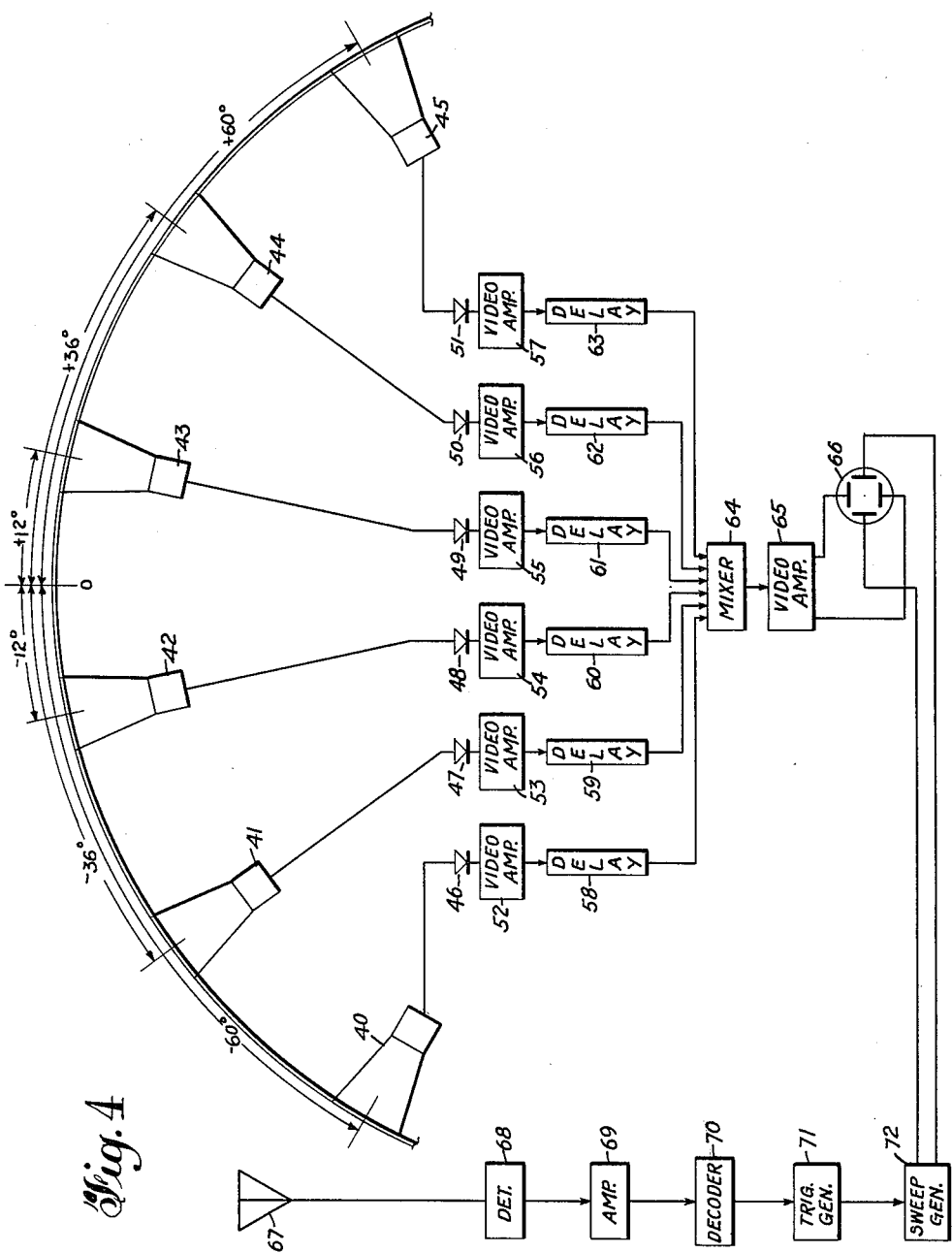

United States Patent Office 3,167,774
Patented Jan. 26, 1965

3,167,774
MULTI-ANTENNA DIRECTION FINDER
Louis A. De Rosa, Bloomfield, N.J., assignor to International Telephone and Telegraph Corporation, a corporation of Maryland
Filed Dec. 5, 1952, Ser. No. 324,170
9 Claims. (Cl. 343—119)

The present invention relates to multi-antenna direction finder systems for indicating the direction of propagation of electromagnetic waves and more particularly to multi-antenna direction finder systems of the amplitude comparison type.

It is known that a direction finder system utilizing a large number of appropriately disposed, highly directive antennas, each feeding a separate receiver, will have a high degree of accuracy. The ultimate in accuracy would be theoretically achieved by utilizing an infinite number of antennas, each capable of receiving only those signals emanating from an infinitesimal portion of the total azimuth. An increase in the number of antennas, with a corresponding increase in the number of associated receivers, results in a corresponding increase in the accuracy of the direction finder system. However, such an ultimate system is highly impractical because of its size and weight, especially if it is desired to use such a system aboard a mobile craft, such as an airplane. Another objection often raised against the desirability of utilizing known types of direction finders aboard aircraft is the decrease of the planes' efficiency due to the aerodynamic interference caused by the antennas of the usual direction finder systems.

In flight an aircraft requires a direction finding system that will yield a bearing indication to a known or an unknown signal which may be recorded instantly and accurately and be readily stored even though the transmission may have an intermittent or pulsed characteristic. The associated antenna system must be relatively free of local reflections and yet not substantially alter the aerodynamic characteristics of the aircraft.

One of the objects of this invention, therefore, is to provide a multi-antenna direction finder particularly suitable for use aboard mobile craft.

Another object of this invention is to provide a direction finder system for indicating the direction of propagation of electromagnetic waves which allows the bearing of the transmitting station to be obtained automatically in a continuous and instantaneous manner, particularly those transmitting stations of the type which transmit in an intermittent manner or for a very short time.

A further object of this invention is to provide a direction finder system, utilizing a plurality of high gain antennas, in which the impedance match to a plurality of receivers in not critical.

In accordance with one feature of this invention, a plurality of directive antennas are disposed for collective coverage of a predetermined parameter, usually azimuth, each having a single lobe perception pattern with their outputs coupled to associated crystal detectors. The detected output due to each antenna is amplified and coupled through a delay line to a common video amplifier whose output is fed to the vertical deflection plates of a cathode ray indicating tube. A linear horizontal trace is provided for the cathode ray indicating tube responsive to the output of a series of coincidence circuits which are fed the paired outputs of the directive antennas or responsive to the output of a mixer circuit which is fed the outputs of the directive antennas.

In accordance with another feature of this invention, the arrival of a coded signal at an omnidirectional antenna on the aircraft triggers a linear horizontal sweep circuit for the cathode ray indicating tube and eliminates the need for the coincidence circuits at the direction finding location.

The above-mentioned and other features and objects of this invention will become more apparent by reference to the following description taken in conjunction with the accompanying drawings, in which:

FIG. 1 is a schematic block diagram of one embodiment of this invention;

FIGS. 2A, 2B, and 2C are illustrations of the indication appearing on the face of the cathode ray indicating tube when a signal is received from various azimuthal directions;

FIG. 3 is a schematic block diagram of another embodiment of this invention; and FIG. 4 is a schematic block diagram of an embodiment of this invention for use with a coded signal transmission.

Referring to FIG. 1, a schematic block diagram of a direction finder system in accordance with the principles of this invention is shown in which the antenna array 1, comprising directive antennas 2 to 7, is designed to have an aggregate coverage of 120 degrees of azimuth. The antenna system 1, comprising six individual horns 2 to 7, may be flush mounted in a ground plane in such a manner that the axes (and therefore the major lobes of the individual field pattern) of the individual horns 2 to 7 will be displaced in azimuth from each other by an angle of 24 degrees. Specifically, in one embodiment of this invention the horns point one to each of the following azimuth angles: −60°, −36°, −12°, +12°, +36°, and +60°. Each directive antenna 2 to 7 may be designed to have an electromagnetic field pattern width of approximately 50 degrees between half power points at a frequency of approximately 3300 mc. While six antennas are shown, it will be clear that a smaller or greater number of antennas may be employed, and the angle coverage, both individually and collectively, may be varied widely. The signal received by each directive antenna 2 to 7 is rectified by crystal detectors 8 to 13, and the rectified output is fed to associated two stage video amplifiers 14 to 19 where the signal level is raised on the order of 50 db. In order to cause effective time displacements among the various routings of an incoming signal and to enable identification of the signal intensity induced in each antenna 2 to 7, the output of the video amplifiers 14 to 19 are coupled through associated time delay lines 20 to 25 where varying time delays $\Delta t$, $2\Delta t$, ... $6\Delta t$ are imposed on the signals received by directive antennas 2 to 7, respectively. The signals, each now having a distinguishing time delay characteristic, are coupled to a mixer 26 whose common output is fed to a two-stage video amplifier 27. The output of amplifier 27 is coupled to the vertical deflection plates of a cathode ray indicating tube 28.

The outputs of video amplifiers 14 and 19, associated with antennas 2 and 7, are fed to a coincidence circuit 29, while the paired outputs of video amplifiers 15 and 16, associated with antennas 3 and 4, and video amplifiers 17 and 18, associated with antennas 5 and 6, are fed to coincidence circuits 30 and 31, respectively. The paired outputs of coincidence circuits 30 and 31 are then fed to coincidence circuit 32. A final coincidence circuit 33 derives its input from coincidence circuits 29 and 32. In order that the inputs to coincidence circuit 33 be in phase, the output of coincidence circuit 29 is coupled through phase inverter 34 before it is fed to coincidence circuit 33. The output of final coincidence circuit 33 is coupled to amplifier circuit 35 wherein its signal level is raised sufficiently to actuate trigger generator 36. The output of the trigger generator 36, responsive to the output of the coincidence circuits 29 to 33 actuates linear sweep generator 37 whose output is coupled to the horizontal deflection plates of the cathode ray indicating tube 28.

In order to describe the operation of the system shown in FIG. 1, assume a transmitter emits a signal pulse within the azimuthal and frequency ranges of antenna array 1. If the transmitter is located on a line equidistant from antennas 4 and 5, equal signal strengths will be received in each antenna 4 and 5 and rectified by crystal detectors 10 and 11. Since antennas 3 and 6 and antennas 2 and 7 will also be equidistant from the transmitter, equal signal strengths will be rectified by crystal detectors 9 and 12, and 8 and 13. The signals, simultaneously induced in the various antennas, are rectified, amplified, and the paired outputs are coupled to coincidence circuits 29 to 33 as heretofore explained. The coincidence circuits 29 to 33 are used for the purpose of triggering the linear time base horizontal trace of the cathode ray indicating tube 28 the instant a signal is received within the angular coverage and frequency range of the antenna array 1. This occurs only if a pulse is induced in more than one channel at the same instant. It is very important that the horizontal indicator trace be initiated only in the presence of a signal which originates external to the direction finder (i.e. an incoming signal) and not by high amplitude internally generated random noise pulses. Accordingly, for this purpose coincidence circuits 29 to 33 are used due to their unique property of discriminating against random noise generated in the crystal rectifiers 8 to 13 and in the amplifiers 14 to 19.

At the same time that the output of the coincidence circuits 29 to 33 initiate the horizontal trace in the cathode ray indicating tube 28, the amplified signals induced in antennas 2 to 7 are each delayed an identifying amount of time in delay lines 20 to 25, then re-amplified in circuit 27, and applied to the vertical deflecting plates of the cathode ray indicating tube 33. The relative amplitudes of the voltages induced in the separate antenna elements 2 to 7 depend upon the direction of arrival of the incoming signal. These relative amplitudes are preserved in the process of rectification. However, due to the action of the delay lines 20 to 25, the amplified signals from antennas 2 to 7 are appropriately delayed so that when they are finally displayed in the cathode ray indicator tube 28, their arrangement on the linear trace is in accord with the physical arrangement of the antenna elements 2 to 7 and their directive receiving patterns. Accordingly, the direction of arrival of incoming radiation can be ascertained by the amplitude distribution of the pulses displayed on the calibrated indicator. As shown in FIG. 2A, when a signal is transmitted from a location equidistant from antenna elements 4 and 5, the amplitude of the signal induced in these elements will be equal when displayed on the cathode ray indicator tube as shown by pulses 38 and 39. The signals induced in all antennas 2 to 7 will be identifiable by the time separation between pulses displayed in tube 28. Thus, the signal induced in antenna 2 will be on the extreme left, and the succeeding pulses will represent the signals due to the other antennas separated by the variable time delay imposed by delay lines 20 to 25.

FIG. 2B represents the face of the cathode ray indicating tube when a signal is emitted by a transmitter located equidistant from antenna elements 3 and 4, while FIG. 2C shows the display pattern when a transmitter located in line with antenna element 7 is emitting the received radiation.

Referring to FIG. 3, a modified embodiment of this invention is shown wherein a pulse received by any one of the plurality of antennas will actuate the sweep circuit of the indicator. The circuitry necessary to actuate the vertical deflection of the indicator is identical with that of the embodiment shown in FIG. 1, comprising a plurality of directive antenna elements (not shown) whose outputs are fed to crystal detectors 8 to 13. The outputs of detectors 8 to 13 are fed through amplifiers 14 to 19, then to delay lines 20 to 25 each impressing a distinct time delay on the output of each amplifier 14 to 19. The distinctively delayed amplified signal outputs from delay circuits 20 to 25 are coupled through mixer 26 and amplifier 27 to the vertical deflection plates of a cathode ray tube indicator 28.

The outputs of video amplifiers 14 to 19 are also coupled to a mixer 29a whose output triggers a sweep generator 37a initiating the horizontal sweep of the cathode ray tube indicator 28. Thus, in mixer 29a the outputs of the directive antenna elements are added directly in such a way that no matter in which directive antenna a signal is received, a single pulse will be fed from mixer 29a to sweep generator 37a and initiate the horizontal sweep of the indicator 28. Therefore, at the instant of reception of any signal in any directive antenna element, the horizontal sweep of indicator 28 will be initiated.

Referring to FIG. 4, a modified embodiment of this invention is shown for use as a "homing" receiver to cooperate with a beacon transmitter. The circuitry necessary to actuate the vertical deflection on the indicator is identical with that of the embodiment shown in FIG. 1, comprising a plurality of directive antenna elements 40–45 fed to crystal rectifiers 46 to 51 whose output is fed through amplifiers 52 to 57 to the variable delay lines 58 to 63. The delay outputs are coupled through mixer 64 and amplifier 65 to the vertical deflection plates of the cathode ray indicating tube 66. The horizontal sweep of the cathode ray indicating tube 66 is initiated by a coded signal of a beacon which is received by omidirectional antenna 67 whose output is detected in circuit 68 and amplified in circuit 69. The amplified signal is decoded in circuit 70 and causes trigger generator 71 to actuate the linear sweep generator 72 whose output is coupled to the horizontal deflection plates of the cathode ray indicating tube 66. The modified embodiment of this invention eliminates the need for coincidence circuits to actuate the horizontal trace on the display tube but requires a cooperating beacon to emit a signal to actuate the horizontal trace simultaneously with the emission of a directive homing signal.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a system for obtaining information on the bearing of a source of electromagnetic wave energy; a plurality of directive antennas disposed for collective coverage of a predetermined range, a plurality of means, each associated with one of said antennas, to detect the signal received by its associated antenna, means to impart an identifying characteristic to the outputs of each of said signal detectors, and means to compare the amplitude of each of said identified signal detections.

2. A system according to claim 1, wherein said means to impart an identifying characteristic to each of said signal detections includes means to delay the output of each of said detecting means a different amount of time whereby the energy induced in one of said directive antennas will be delayed a different amount of time with respect to the energy induced in the others of said directive antennas.

3. A system according to claim 1, wherein said means to compare includes a cathode ray tube having a plurality of means for deflecting the electron beam thereof, means to apply said identifiable signal detections to one of said deflecting means and means responsive to said electromagnetic wave energy to apply a linear time trace voltage to other of said deflecting means.

4. A direction finder comprising an antenna system having a plurality of directive patterns disposed for side by side coverage, a plurality of means, each associated with one of said directive patterns to detect the signal received by said directive pattern portion of the antenna system; a plurality of delay lines each having a different time delay characteristic, means to apply said detected energy derived from said antenna system in accordance with each of said patterns to the input of separate ones of said delay lines, so that the energy derived according to one of said patterns will be delayed in time with respect to energy derived according to other of said patterns, and means to compare relative amplitudes of the output of said delay lines.

5. A direction finder according to claim 4, wherein said means to compare includes a cathode ray tube having a plurality of beam deflecting means, means to apply the output of said delay lines to one of said beam deflecting means, and means to cause a linear time trace to be applied to other of said deflecting means when a signal is received by said antenna system.

6. In a system for obtaining information on the bearing of a source of radio signals, a cathode ray indicating tube having a plurality of means for deflecting the electron beam thereof, means to apply a linear time base deflecting voltage to one of said deflecting means responsive to said signals, an antenna system having a plurality of directive horn antennas each disposed for coverage of a predetermined portion of the azimuth and cooperating with other horn antennas of the antenna system to provide collective coverage of a predetermined range, a plurality of means, each associated with one of said horn antennas to detect the signal of said associated horn antenna; a plurality of time delay means each having a different delay characteristic, means to apply the detected energy induced in each directive horn antenna by said signals to separate ones of said delay means, and means to apply said detected delayed signal energy to other of said means for deflecting the said beam whereby the relative amplitudes of the signal energy induced in each directive horn antenna may be compared with the signal energies induced in other horn antennas.

7. A system according to claim 6, wherein said means to apply a linear time base deflecting voltage includes a linear time sweep generator, means to generate a pulse to trigger said sweep generator when a plurality of said directive antenna simultaneously receive signal energy.

8. A system according to claim 6, wherein said means to apply a linear time base deflecting voltage includes a linear time sweep generator and means to couple the outputs of said directive antennas to said generator to initiate said linear time base deflecting voltage when any of said antennas receive signal energy.

9. A system according to claim 6, wherein said means to apply a linear time base deflecting voltage includes means to detect a predetermined coded signal, means to generate a trigger pulse responsive to said decoded signal, and a linear time sweep generator responsive to said trigger pulse.

References Cited in the file of this patent

UNITED STATES PATENTS

| | | |
|---|---|---|
| 2,448,041 | Marchand | Aug. 31, 1948 |
| 2,487,759 | Kircher | Nov. 8, 1949 |
| 2,489,304 | Marchand et al. | Nov. 29, 1949 |